(12) United States Patent (10) Patent No.: US 7,420,539 B2
Ryu et al. (45) Date of Patent: Sep. 2, 2008

(54) METHOD OF STABILIZING HAPTIC INTERFACE AND HAPTIC SYSTEM USING THE SAME

(75) Inventors: Je-Ha Ryu, Gwangju (KR); Jong-Phil Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 636 days.

(21) Appl. No.: 10/969,645

(22) Filed: Oct. 20, 2004

(65) Prior Publication Data

US 2005/0231480 A1 Oct. 20, 2005

(30) Foreign Application Priority Data

Apr. 20, 2004 (KR) ...................... 10-2004-0026918

(51) Int. Cl.
*G09G 5/00* (2006.01)
(52) U.S. Cl. ........................ 345/156; 345/157; 345/163; 345/172; 703/2; 715/701
(58) Field of Classification Search ................. 345/156, 345/157, 163–172
See application file for complete search history.

(56) References Cited

U.S. PATENT DOCUMENTS

| | | | |
|---|---|---|---|
| 7,027,965 B2 * | 4/2006 | Hannaford et al. | ............. 703/2 |
| 2002/0033841 A1 * | 3/2002 | Rosenberg | .................. 345/701 |
| 2004/0054446 A1 * | 3/2004 | Sanpei et al. | ................... 701/1 |

* cited by examiner

*Primary Examiner*—Richard Hjerpe
*Assistant Examiner*—Jennifer T Nguyen
(74) *Attorney, Agent, or Firm*—Mitchell P. Brook; Luce, Forward, Hamilton & Scripps

(57) ABSTRACT

A method of stabilizing a haptic interface and a haptic system using the same, are provided. The method comprises detecting a value of a physical parameter related to a motion generated by a human operator's action in an actual element included in the haptic device at each predetermined time interval, calculating a force to respond to the human operator reversely through the haptic device in the virtual environment in response to the value of the physical parameter, calculating a bounding parameter that satisfies first stabilization conditions in which energy generated during sampling and holding is to be dissipated by the haptic device and second stabilization conditions in which energy generated by the control system is to be passive, from the calculated force and the calculated value of the physical parameter, if the calculated bounding parameter is out of a predetermined bounding range, adjusting the calculated bounding parameter in the predetermined bounding range, adjusting a force to be applied to the actual element included in the haptic device using the adjusted bounding parameter; applying the adjusted force to the actual element included in the haptic device, and repeatedly performing the detecting of the value of the physical parameter through the applying of the adjusted force at each predetermined time interval. According to the method and system, lowering of a realistic degree which a haptic system pursues is prevented and the haptic system can be stabilized.

4 Claims, 10 Drawing Sheets

METHOD OF STABILIZING HAPTIC INTERFACE AND HAPTIC SYSTEM USING THE SAME

TECHNICAL FIELD

The present invention relates to a method of stabilizing a haptic interface and a haptic system using the same, and more particularly, to a method of stabilizing a haptic interface by which the occurrence of unstable energy during haptic interfacing is minimized and a realistic degree is increased, and a haptic system using the same.

BACKGROUND ART

'Haptic' means transmission of information about physical properties related to a tactile sensation such as inertia, friction, collision, temperature, and roughness.

A haptic technology has been rapidly developed with the use of a force feedback technology after 1990.

A haptic system using the haptic technology provides a motion sensation in which a human operator feels a motion or force from muscles or joints in response to a haptic interaction between a virtual object realized by a virtual environment and the human operator's manipulation.

An example of a haptic system is shown in FIG. 1.

Referring to FIG. 1, a haptic system 10 comprises a haptic device 11, a sample/hold unit 13, a controller 15, and a virtual environment 17.

Here, the haptic device 11 is an operating device which a human operator 20 manipulates personally. The haptic device 11 transfers a stimulus generated from a virtual environment in response to this manipulation to the human operator 20 reversely.

The sample/hold unit 13 is an input/output device, which converts an analog signal as a continuous signal output from the haptic device 11 into a digital signal and provides the digital signal to the controller 15. In addition, the sample/hold unit 13 converts a digital signal as a discrete signal output from the controller 15 into an analog signal and provides the analog signal to the haptic device 11.

A control system comprises the controller 15 and the virtual environment 17.

The control system is generally implemented by a computer and an application program. Here, the application program means a program configured to implement a virtual environment via a computer.

In the haptic system 10, an interaction between the human operator 20 and the virtual environment 17 realized by the controller 15 is performed by the haptic device 11. In other words, a stimulus generated from the virtual environment 17 is reversely transferred to the human operator 20 via the haptic device 11 from the control system in response to the human operator's manipulation.

Thus, the haptic system 10 provides a force and a tactile sensation generated from the virtual environment 17 in a reverse direction to the human operator 20 via the haptic device 11 in response to the human operator's manipulation, so that the human operator 20 can make an interaction with the virtual environment 17 sensationally and impressively via the haptic device 11.

For several reasons, for example, loss of information that occurs in sampling when the sample/hold unit 13 converts information from a continuous system to a discrete system, time delay caused by holding, numerical operations performed by a control system, and so on, undesired generation of energy may occur in the haptic system 10. Such undesired energy generation may cause the haptic device 11 to produce an unstable motion, adversely affecting the human operator 20. Thus, in order to ensure human operator's stability, the energy transferred from the control system to the haptic device 11 should be appropriately adjusted and unnecessary energies, which may cause an unstable behavior, should be removed.

However, since the human operator's motion includes a variety of uncertainties, it is difficult to precisely model the human operator's motion. In addition, since energy is necessarily generated when the sample/hold unit 13 performs sampling and holding and the virtual environment 17 is generally non-linear, it is very difficult to find a method of stabilizing the haptic system 10.

In recent years, a variety of methods of stabilizing the haptic system 10 have been suggested.

Cited reference 1 by J. Robot, Syst., vol. 14, No. 1, pp. 37-47, 1997 discloses virtual coupling derived from a passivity theorem in which the haptic system 10 has passivity. In virtual coupling, impedance generated by a haptic interface is limited to a range of guaranteeing a stable operation independent of impedance which a virtual environment satisfying passivity conditions requires and virtual environment design procedures are separated from problem of stability of the haptic interface.

However, since virtual coupling guarantees stability for a virtual environment satisfying passivity conditions, when unnecessary energy is generated by a numerical operation in the virtual environment and time delay, the range of impedance, which the haptic interface can express, may be reduced or stability itself may be lost.

In addition, since virtual coupling design is based on a damping element (for example, energy consumption element including friction in joints or a counter-electromotive force in an electric actuator) that exists in a haptic interface, very complex dynamic properties of the haptic interface should be identified, so as to search for parameter values of optimized virtual coupling. Furthermore, in a haptic interface having higher order degrees of freedom, the effect of the damping element depends on the position and attitude of ends in a workspace. However, since virtual coupling has fixed parameter values, selection contrary to worst case conditions should be made, so as to guarantee stability in the entire workspace. Thus, excessively careful design should be performed.

U.S. Patent Published Application No. 2002-0062177 to Hannaford and Ryu et al. discloses time domain passivity control method, which is an energy consumption algorithm based on the passivity theorem. Since the method is not based on an energy consumption element that exists in a haptic interface, unlike in virtual coupling, identification of complex dynamic properties of the haptic interface or design prepared for worst case conditions does not require. However, in time domain passivity control, since the entire haptic system is assumed as a discrete system and derived therefrom, the effect of sample-and-hold has not been reflected. Thus, in time domain passivity control, energy generated by the sample/hold unit 13 cannot be compensated for.

More recently, cited reference 2 (Robots and Automation 2003, Taipei, Taiwan, September 2003) presented by Hannaford and Ryu et al. in IEEE international conference discloses continuous time domain passivity for compensating for energy generated by sample-and-hold. The method uses a simple velocity prediction method in an adjusted passivity observer (PO) and passivity controller (PC). However, if the sign of velocity is changed, the adjusted passivity controller (PC) generates energy as in a virtual damper. Thus, in order to apply the method stably, a sampling rate should be sufficiently larger than that of a system mode. In addition, in the method, since the human operator's motion includes a variety of uncertainties, it is very difficult to predict a velocity and it is difficult to compensate for energy properly.

Problems with the above-mentioned conventional methods of stabilizing a haptic system will now be described in more detail.

Passivity is an abstract formulation related to energy dissipation, and a passivity theorem based on input/out aspect is used to solve problem of stability for linear and non-linear systems. A system itself satisfying passivity conditions cannot generate energy, and thus guarantees a stable operation.

In fact, a passive system can be generally found in the field of engineering. A system comprising a capacitor and an inductor is an example of a passive system in the field of electrical engineering, and a system having mass, spring, and dashpots is an example of another passive system in the field of mechanical engineering.

According to the passivity theorem, when one passive system and another strict passive system are connected to each other by feedback, the system is stable. This point gives a large advantage to solve problem of stability for robotics in which several systems are complexly connected, teleoperation, and haptic system.

If it is assumed that the human operator 20 is passive at frequencies of interest in the haptic system 10 shown in FIG. 1 based on the passivity theorem, problem of stability is summarized to passivity of the remaining combination elements and can be expressed as equation 1:

$$\int_0^t F_h(\tau)v_h(\tau)d\tau + \varepsilon_0 \geq 0 \text{ for } t > 0 \text{ and for admissible } F_h(t) \quad (1)$$

where $F_h(\tau)$ and $V_h(\tau)$ are the human operator's force and velocity respectively, that are continuous variables, and $\varepsilon_0$ is initial energy of the haptic system 10.

When the haptic system 10 satisfies passivity conditions expressed as Expression 1, the haptic system 10 dissipates energy, and the sum of energy flow-in of each of the haptic device 11, the sample/hold unit 13, the controller 13, and the virtual environment 17 cannot be negative at all.

Then, each energy flow-in relationship will be described with reference to FIGS. 2 and 3. The haptic device 11 shown in FIG. 2A is a continuous subsystem, and thus, energy flow-in $P_H(n)$ during time t in the range of $0 \leq t \leq nT$ can be calculated using equation 2.

$$P_H(n) = \int_0^{nT} \{F_h(t)v_h(t) - F_d^h(t)v_d(t)\}dt \quad (2)$$

Since the haptic device 11 includes passive elements, the haptic device 11 itself does not generate energy. Substantially, all mechanical haptic devices 11 have energy consumption elements such as back electromotive force in an electric actuator, hysteretic material properties, and friction, and thus satisfy passivity conditions. For example, considering the haptic device having one degree of freedom shown in FIG. 3, energy flow-in of the haptic device 11 shown in equation 2 can be calculated using equation 3.

$$P_H(n) = \int_0^{nT}(mv_d\dot{v}_d + bv_d^2)dt \geq \int_0^{nT}bv_d^2 dt \geq T\sum_{k=0}^{n-1}bv_{d,k+1}^2 \quad (3)$$

As shown in equation 3, energy flow-in value of the haptic device 11 has a nonnegative value for a nonnegative damping constant, and a lower bound value is associated with dissipative damping components inside the haptic device 11 finitely.

The dissipative elements in the haptic device 11 give some allowance of the occurrence of energy in other components. In particular, since energy is necessarily generated by the sample/hold unit 13 having substantially phase lag, the dissipative elements in the haptic device 11 are very important, in order to guarantee a stable haptic interaction.

A control system 14 (FIG. 2C) comprising a controller 15 and a virtual environment 17 is a discrete subsystem, and energy flow-in $P_{CV}(n)$ can be calculated using equation 4.

$$P_{CV}(n) = T\sum_{k=0}^{n-1}F_d(k)v_{d,k} \quad (4)$$

The control system 14 includes some energy generation elements, that is, explicit numerical integration algorithms in simulating virtual environment, phase lags in position or velocity filters, communication delays when the haptic device 11 is connected to the virtual environment 17 via a network, gravity, or a friction compensation algorithm.

An energy consumption algorithm such as the time domain passivity algorithm described previously can dissipate effectively energy generated by the discrete control system 14.

The sample/hold unit 13 (FIG. 2B) is a sampled data system, and energy flow-in $P_S(n)$ can be calculated using equation 5.

$$P_S(n) = \int_0^{nT} F_d^h(t)v_d(t)dt - T\sum_{k=0}^{n-1}F_d(k)v_{d,k} \quad (5)$$

In addition, in the case of zero order hold (ZOH), energy flow-in of the sample/hold unit 13 can be calculated using equation 6.

$$P_S(n) = \sum_{k=0}^{n-1}\left(\int_{kT}^{(k+1)T}F_d^h(t)v_d(t)dt\right) - T\sum_{k=0}^{n-1}F_d(k)v_{d,k} \quad (6)$$

$$= \sum_{k=0}^{n-1}F_d(k)(x_{d,k+1} - x_{d,k}) - T\sum_{k=0}^{n-1}F_d(k)v_{d,k}$$

equation 6 shows that the sample/hold unit 13 may generate energy even though the control system 14, that is, the controller 15 and the virtual environment 17, made be passive.

Energy flow-in $P_{SCV}(n)$ in a combined system of the sample/hold unit 13 and the control system 14 can be calculated using equation 7.

$$P_{SCV}(n) = P_S(n) + P_{CV}(n) = \sum_{k=0}^{n-1} F_d(k)(x_{d,k+1} - x_{d,k}) \quad (7)$$

In order to stabilize the haptic system 10, energy flow-in $P_{HSCV}(n)$ should have a nonnegative value of the entire haptic system 10. Considering this, passivity conditions on a stable haptic interaction shown in equation 1 can be defined by equation 8.

$$P_H(n) + \sum_{k=0}^{n-1} F_d(k)(x_{d,k+1} - x_{d,k}) \geq 0 \quad (8)$$

In addition, with respect to the haptic device 11 having a first order degree of freedom, equation 8 can be rewritten as equation 9.

$$T\sum_{k=0}^{n-1} bv_{d,k+1}^2 + \sum_{k=0}^{n-1} F_d(k)(x_{d,k+1} - x_{d,k}) \geq 0 \quad (9)$$

Meanwhile, virtual wall simulation is widely used as a benchmark example revealing many fundamental issues for the stable haptic interaction. In the case of research on the virtual wall simulation for the haptic device having a first order degree of freedom 1-dof, an energy relationship of each subsystem having basic virtual elements such as damping and stiffness can be more easily known.

For simplicity of explanation, it is assumed that a perfect controller 15 ($F_d(k)=F_e(k)\equiv F(k)$, $x_{d,k}=x_{e,k}\equiv x_k$), zero order hold (ZOH) for a hold operation and a backward rectangular rule for velocity estimation. Then, let's consider a virtual wall represented in equation 10, so as to derive the relationship between physical damping of the haptic device 11 and a virtual wall parameter.

$$F(k) = Kx_k + Bv_k \quad (10)$$

Energy flow-in calculated using equation 4 of the control system 14 regarding the virtual wall can be calculated using equation 11 and this satisfies the passivity conditions.

$$P_{CV}(n) = K\sum_{k=0}^{n-1} x_k(x_k - x_{k-1}) + TB\sum_{k=0}^{n-1} v_k^2$$
$$= \frac{1}{2}K\sum_{k=0}^{n-1}(x_k^2 - x_{k-1}^2) + \frac{1}{2}K\sum_{k=0}^{n-1}(x_k - x_{k-1})^2 + TB\sum_{k=0}^{n-1} v_k^2$$
$$\geq \frac{1}{2}T^2K\sum_{k=0}^{n-1} v_k^2 + TB\sum_{k=0}^{n-1} v_k^2 \quad (11)$$

equation 11 shows that a virtual spring and a damping element do not generate energy in the control system 14, and shows that a passivity observer provides a positive value for all time by equation 4.

Energy flow-in of the subsystem in which the sample/hold unit 13 and the control system 14 are combined, can be calculated using equation 12.

$$P_{SCV}(n) = P_S(n) + P_{CV}(n) \quad (12)$$
$$= K\sum_{k=0}^{n-1} x_k(x_{k+1} - x_k) + TB\sum_{k=0}^{n-1} v_k v_{k+1}$$
$$= \frac{1}{2}K\sum_{k=0}^{n-1}(x_{k+1}^2 - x_k^2) - \frac{1}{2}K\sum_{k=0}^{n-1}(x_{k+1} - x_k)^2 +$$
$$TB\sum_{k=0}^{n-1} v_k v_{k+1} \geq -\frac{1}{2}T^2K\sum_{k=0}^{n-1} v_{k+1}^2 - TB\sum_{k=0}^{n-1} v_{k+1}^2$$

However, the subsystem, in which the sample/hold unit 13 and the control system 14 are combined with each other, does not satisfy the passivity conditions due to the sample/hold unit 13 any longer.

In addition, a lower bound of the subsystem in which the sample/hold unit 13 and the control system 14 are combined, means a maximum energy which the virtual spring and the damper can generate, as shown in equation 12.

In the case of the haptic device 11 having a first order degree of freedom, energy flow-in $P_{HSCV}(n)$ of the haptic system 10 can be calculated using equation 13.

$$P_{HSCV}(n) = P_H(n) + P_{SCV}(n) \geq \quad (13)$$
$$T\sum_{k=0}^{n-1} bv_{k+1}^2 - \frac{1}{2}T^2K\sum_{k=0}^{n-1} v_{k+1}^2 - TB\sum_{k=0}^{n-1} v_{k+1}^2$$

In order to create a stable haptic interaction, considering that energy flow-in $P_{HSCV}(n)$ of the haptic system 10 should have a nonnegative value, virtual damping and stiffness can be obtained by:

$$b \geq \frac{KT}{2} + B \quad (14)$$

which explains very well-known stabilization conditions with respect to virtual wall simulation of virtual coupling studied by the above-described cited reference 1. As described previously, from the viewpoint of energy, the above condition means that energy generated by the virtual spring and damping parameter value should be constrained within the consumable energy by the haptic device 11.

An unstable behavior of the haptic system is based on unnecessary energy generated by the sample/hold unit and the virtual environment including a haptic rendering algorithm and a control algorithm constituting the haptic system. For example, explicit numerical integration included in the haptic rendering algorithm, filter included in the control algorithm and gravity compensator are well known as causes for energy generation. In addition, the occurrence of energy caused by phase lag necessarily included in the sample/hold unit is recognized as a structural problem of the haptic system. However, since an existing virtual coupling algorithm cannot compensate for energies generated in the virtual environment, the virtual environment should be designed to satisfy the passivity conditions. In addition, since an existing time domain passivity algorithm cannot compensate for energies generated by sampling and hold, the occurrence of energy caused by phase lag should be minimized by very fast sampling.

As described above, the haptic device 11 does not generate energy but the sample/hold unit 13 and the control system 14 generates energy. In the above-described prior arts, there are design limitations needed in stabilization of the haptic system, and owing to adjustment procedures for stabilization, a realistic degree is lowered.

DISCLOSURE OF THE INVENTION

The present invention provides a method of stabilizing a haptic interface by which a stable haptic system is realized by compensating for unnecessary energy generated in sampling and holding procedures as well as discrete environment that is composed of controller and virtual environment.

Another object of the present invention is to provide a method of stabilizing a haptic interface by which releasing limitation of the sampling rate needed in stabilization of the system and improving the realistic degree.

Also, the present invention provides the haptic system using the stabilizing method.

According to one aspect of the present invention, there is provided a method of stabilizing a haptic interface, the method comprising detecting a value of a physical parameter related to a motion generated by a human operator's action in an actual element included in the haptic device at each predetermined time interval, calculating a force to respond to the human operator reversely through the haptic device in the virtual environment in response to the value of the physical parameter, calculating a bounding parameter that satisfies first stabilization conditions in which energy generated during sampling and holding is to be dissipated by the haptic device and second stabilization conditions in which energy generated by the control system is to be passive, from the calculated force and the calculated value of the physical parameter, if the calculated bounding parameter is out of a predetermined bounding range, adjusting the calculated bounding parameter in the predetermined bounding range, adjusting a force to be applied to the actual element included in the haptic device using the adjusted bounding parameter, applying the adjusted force to the actual element included in the haptic device, and repeatedly performing the detecting of the value of the physical parameter through the applying of the adjusted force at each predetermined time interval.

Preferably, the physical parameter in the detecting of the value of the physical parameter is position or velocity.

The bounding parameter $\beta(k)$ may be calculated by $$\beta(k) = \begin{cases} \dfrac{F_e(k) - F_d(k-1)}{v_{d,k}} & \text{if } v_{d,k} \neq 0 \\ 0 & \text{otherwise} \end{cases} \text{ or}$$

$$\beta(k) = \begin{cases} T\dfrac{F_e(k) - F_d(k-1)}{x_{d,k} - x_{d,k-1}} & \text{if } x_{d,k} - x_{d,k-1} \neq 0 \\ 0 & \text{otherwise} \end{cases},$$

where T is the predetermined time interval, $F_e(k)$ is a force to respond to the human operator in the virtual environment in response to the physical parameter detected at a k-th time interval, $F_d(k-1)$ is a force applied to an actual element of the haptic device at a (k−1)-th time interval, and $v_{d,k}$ and $x_{d,k}$ is velocity or position detected by the haptic device by human operator's manipulation.

In addition, in the adjusting of the calculated bounding parameter, if the bounding parameter $\beta(k)$ is greater than a predetermined maximum value $\beta$max, the bounding parameter $\beta(k)$ is adjusted to the maximum value $\beta$max, if the bounding parameter $\beta(k)$ is smaller than a predetermined minimum value $\beta$min, the bounding parameter $\beta(k)$ is adjusted to the minimum value $\beta$min, and if the bounding parameter $\beta(k)$ is between the maximum value $\beta$max and the minimum value $\beta$min, the bounding parameter $\beta(k)$ is used without changes.

In accordance with another aspect of the present invention, there is provided a haptic system in which an interaction between a control system including a virtual environment and a haptic device is supported, the haptic system comprising a sensor detecting a physical parameter related to a motion generated by the haptic device by a human operator's action, and an energy bounding processor installed in the control system, calculating a bounding parameter that satisfies first stabilization conditions in which energy generated during sampling and holding is to be dissipated by the haptic device and second stabilization conditions in which energy generated by the control system is to be passive, from a force to respond to the human operator reversely through the haptic device in the virtual environment in response to the physical parameter detected by the sensor at each predetermined time interval and the physical parameter, if the calculated bounding parameter is out of a predetermined bounding range, adjusting the calculated bounding parameter in the predetermined bounding range, calculating a force to be applied to the actual element included in the haptic device using the bounding parameter determined by adjustment, and applying the adjusted force to the actual element included in the haptic device.

BEST MODE FOR CARRYING OUT THE INVENTION

Hereinafter, a method of stabilizing a haptic interface according to an embodiment of the present invention and a haptic system using the same will be described in more detail with reference to the attached drawings.

Figure 1:
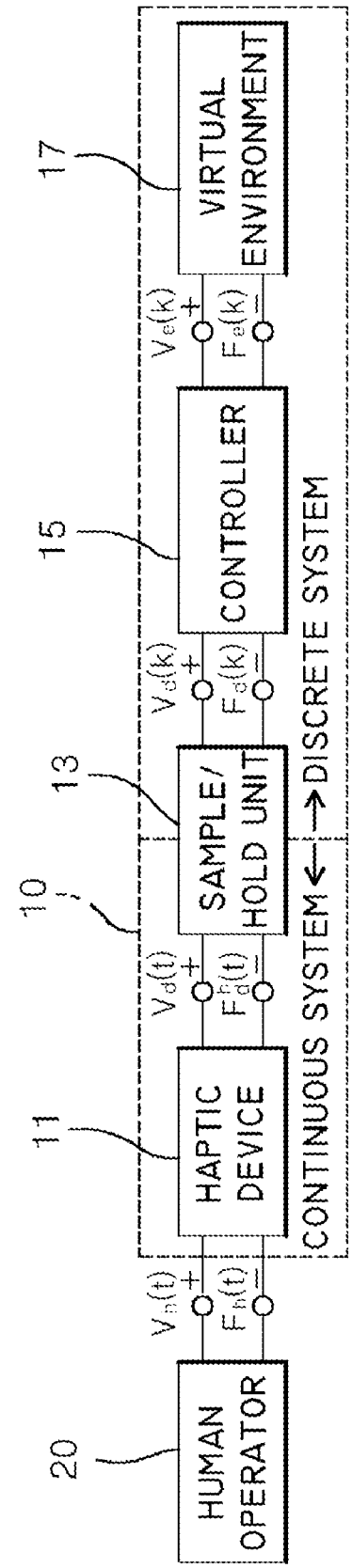
FIG. 1 is a block diagram of a conventional haptic system.
Figure 2B:
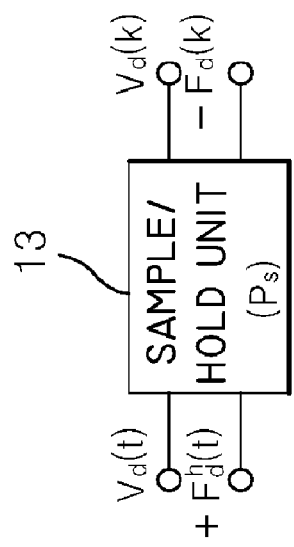
FIGS. 2A through 2C show related parameters in an energy flow-in aspect by separating a part of elements of the haptic system shown in FIG. 1.
Figure 3:
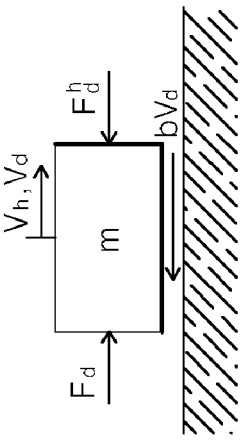
FIG. 3 shows a haptic interface model having a first order degree of freedom.
Figure 2A:
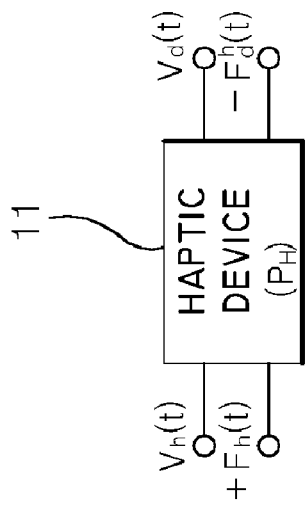
Figure 2C:
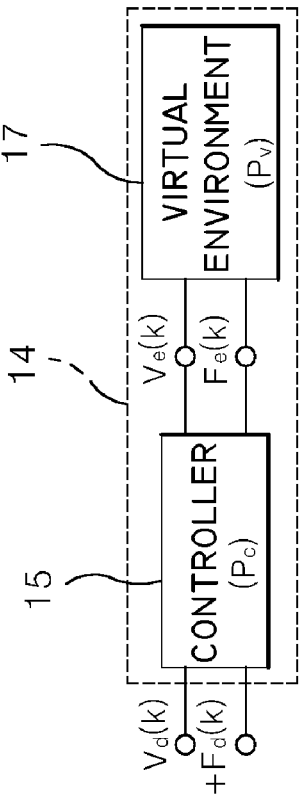
Figure 4:
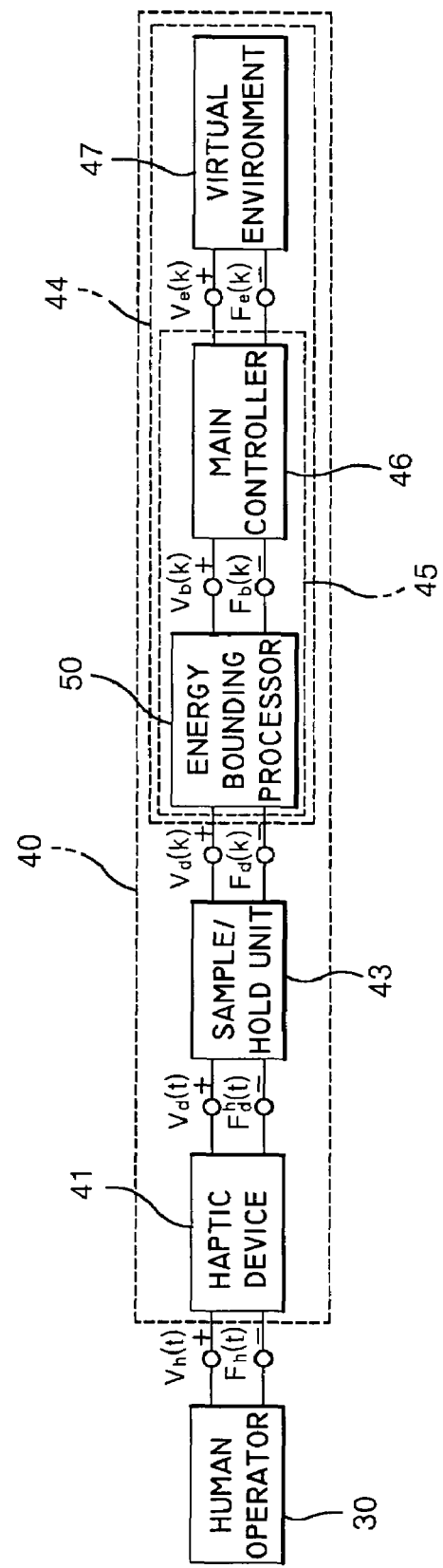
FIG. 4 is a block diagram of a haptic system having an energy bounding processor according to an embodiment of the present invention.

FIG. 4 shows a haptic system according to an embodiment of the present invention.

Referring to FIG. 4, the haptic system 40 includes a haptic device 41, a sample/hold unit 43, and a control system 44 having an energy bounding processor 50.

The haptic device 41 is manipulated by a human operator himself/herself, and reversely transfers a stimulus generated from a virtual environment 47 in response to this manipulation to the human operator 20.

The haptic device 41 generally comprises a haptic mechanism, an actuator, and a sensor.

The haptic device 41 may include a sensor which measures position or velocity based on manipulation of the haptic device 41 by human operator 30.

The sample/hold unit 43 converts an analog signal as a continuous signal output from the haptic device 41 into a digital signal and provides the digital signal to the control system 44. In addition, the sample/hold unit 43 converts a digital signal as a discrete signal output from the control system 44 into an analog signal and provides the analog signal to the haptic device 41.

The control system 44 comprises the energy bounding processor 50, a main controller 46, and the virtual environment 47.

The control system 44 is generally implemented by a computer.

The virtual environment 47 is configured in a variety of modes according to development purposes and intensions.

The controller 45 comprises the main controller 46 and the energy bounding processor 50.

The main controller 46 performs the virtual environment 47 and controls the haptic device 41.

The main controller 46 may include a motion calculator which calculates forward kinematics, inverse kinematics, Jacobian and inverse dynamics, and a gravity and friction compensation program.

The energy bounding processor 50 adjusts a force that should be generated in the virtual environment 47, according to a control law and a bounding law which will be described later and outputs the force to the haptic device 41 through the sample/hole unit 43.

Figure 5:
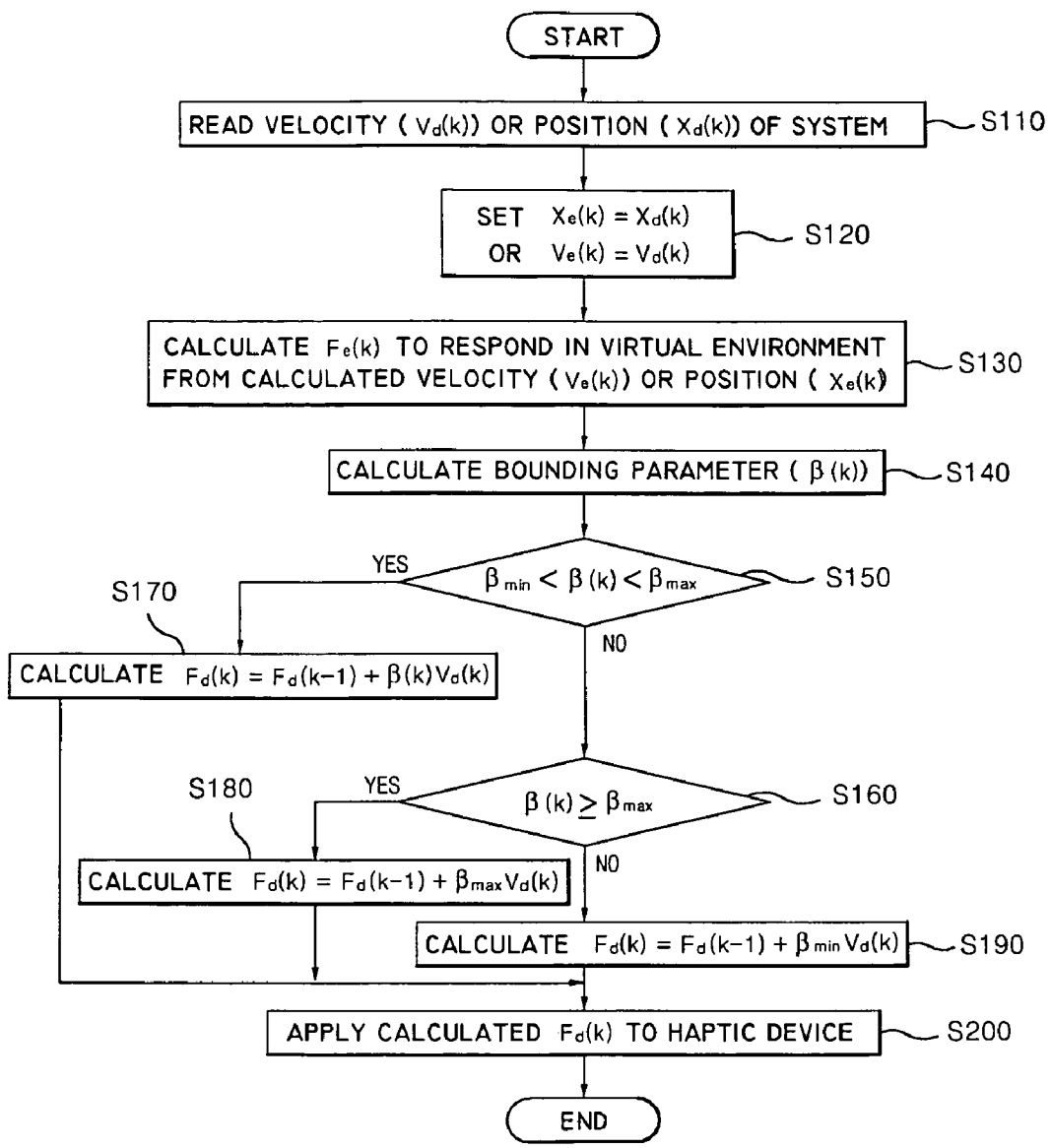
FIG. 5 is a flowchart illustrating an energy bounding processing procedure using a method of stabilizing a haptic interface according to an embodiment of the present invention.

A method of stabilizing a haptic interface according to an embodiment of the present invention will now be described with reference to FIG. 5.

First, in step S110, during initialization, K is set to zero and $F_d(K)$ is set to zero and after initialization, a value of a physical parameter is read related to motion generated by the human operator's action in an actual element included in the haptic device 41 at each time interval.

Here, position $x_d(k)$ or velocity $v_d(k)$ may be used as the physical parameter.

Next, in step S120, the read value of physical parameter, that is, the read value of velocity or position is set to a value of velocity or position of the virtual environment 47.

Subsequently, in step S130, a force $F_e(k)$ to respond to the human operator 30 reversely through the haptic device 41 is calculated from velocity or position set in step S120 in the virtual environment 47.

Then, in step S140, a bounding parameter β(k) is calculated using the calculated force $F_e(k)$ and the calculated value of physical parameter in step S110.

Here, the bounding parameter β(k) for velocity is calculated by $$\beta(k) = \frac{F_e(k) - F_d(k-1)}{v_{d,k}},$$

and the bounding parameter β(k) for position is calculated by $$\beta(k) = T\frac{F_e(k) - F_d(k-1)}{x_{d,k} - x_{d,k-1}}.$$

Here, T is a predetermined time interval, that is sampling rate, $F_e(k)$ is a force to respond to the human operator 30 in the virtual environment in response to the physical parameter detected by a sensor at a k-th time interval, and $F_d(k-1)$ is a force applied to an actual element of the haptic device 41 at a (k-1)-th time interval.

Next, it is determined whether the calculated bounding parameter β(k) is in a predetermined bounding range and if it is determined that the calculated bounding parameter β(k) is out of the bounding range, a bounding parameter is adjusted in the predetermined bounding range, and then a force to be applied to the actual element of the haptic device 41 is calculated.

Here, adjustment of the bounding parameter states that if the bounding parameter β(k) is equal to or less than a predetermined minimum value β(min), β(k) is adjusted to β(min) and if the bounding parameter β(k) is equal to or greater than a predetermined maximum value β(max), β(k) is adjusted to β(max) and if the bounding parameter β(k) is between the maximum value β(max) and the minimum value β(min), β(k) is used without changes.

A force calculation procedure using this adjustment will now be described in greater detail. That is, in step S150, it is determined whether the bounding parameter β(k) calculated in step S140 is in the predetermined bounding range.

If it is determined in step S150 that the bounding parameter β(k) is in the predetermined bounding range, in step S170, the force to be applied to the actual element of the haptic device 41 is calculated using the calculated bounding parameter β(k).

On the other hand, if it is determined in step S150 that the bounding parameter β(k) is out of the predetermined bounding range, in step S160, it is determined whether the bounding parameter β(k) is equal to or less than the predetermined minimum value βmin.

If it is determined in step S160 that the bounding parameter β(k) is equal to or less than the predetermined minimum value βmin, in step S180, the force to be applied to the actual element of the haptic device 41 is calculated by using the bounding parameter β(k) as the predetermined minimum value βmin.

On the other hand, if it is determined in step S160 that the bounding parameter β(k) is equal to or greater than the predetermined maximum value βmax, in step S190, the force to be applied to the actual element of the haptic device 41 is calculated by using the bounding parameter β(k) as the predetermined maximum value βmax.

Finally, in step S200, the calculated force $F_d(k)$ is applied to the actual element of the haptic device 41 through the sample/hold unit 43.

This procedure is repeatedly performed every time interval T.

The haptic system 40 can be stabilized by the method of stabilizing the haptic interface (to be hereinafter referred to as an energy bounding processing method), which will now be described in greater detail.

The energy bounding processor 50 makes the control system 44 including the main controller 46 and the virtual environment 47 passive and restricts all of energy generated by the sample/hold unit 43 to be dissipated by the energy dissipation element existing in the haptic device 41. The energy bounding processor 50 always guarantees that the haptic system 40 performs a haptic interaction stably.

The energy bounding processor 50 processes the energy relationship between the sample/hold unit 43 and the control system 44 separately. This is because energy generated by the control system 44 can be precisely compensated and it is unnecessary to dissipate the energy generated by the control system 44 using physical damping of the actual element included in the haptic device 41. By doing this, much energy generated by the sample/hold unit 43 can be dissipated by physical damping of the actual element of the haptic device 41.

To this end, in the energy bounding processing method, first and second stabilization conditions can be expressed by:

$$P_H(n) + T\sum_{k=1}^{n} F_d(k-1)v_{d,k} - T\sum_{k=1}^{n} F_d(k)v_{d,k} \geq 0 \quad (15)$$

$$T\sum_{k=1}^{n} F_d(k)v_{d,k} \geq 0 \quad (16)$$

Equation 15 states conditions in which energy generated by the sample/hold unit 43 is completely dissipated by the haptic device 41, and equation 16 states conditions in which both the main controller 46 and the virtual environment 47 are passive. In order to satisfy the conditions, the energy bounding processor 50 uses a control law and a bounding law that can be defined in equation 17:

$$F_d(k)=F_d(k-1)+\beta(k)v_{d,k} \quad (17)$$

where $v_{d,k}=v_{b,k}$.

In addition, as described above, the bounding law uses that if β(k)>βmax, β(k)=βmax (maximum bounding law) and if β(k)<βmin, β(k)=βmin (minimum bounding law).

Here, β(k) is calculated using equation 18 when the physical parameter at which the human operator's motion applied to the haptic device 41 is detected is used as velocity.

$$\beta(k) = \begin{cases} \dfrac{F_e(k) - F_d(k-1)}{v_{d,k}} & \text{if } v_{d,k} \neq 0 \\ 0 & \text{otherwise} \end{cases} \quad (18)$$

By using the control law and the bounding law defined in equation 17, a force to be generated by the actual element such as actuator included in the haptic device 41 follows a desired control force $F_b(k)$. Here, the control law shown in equation 17 is used to easily find the bounding law that satisfies equation 15.

If there is no bounding law, the control law makes the actuator force $F_d(k)$ to be the same as the control force $F_b(k)$. In this case, it cannot be guaranteed that the first stabilization conditions and the second stabilization conditions are satisfied.

Thus, the system should be stabilized using the above-described bounding law. That is, by using the control law, the force generated by the actual actuator follows the desired force to be generated by the virtual environment 47 and the main controller 46 and by using the bounding law, the first stabilization conditions and the second stabilization conditions that guarantee passivity of the entire haptic system 40 are satisfied.

Now, it will be described whether or not the energy bounding processing method satisfies the first stabilization conditions and the second stabilization conditions for a stable haptic interaction and which maximum and minimum bounding values are required to satisfy the first and second stabilization conditions.

First, in the first stabilization conditions, a part expressed by $$T\sum_{k=1}^{n} F_d(k-1)v_{d,k} - T\sum_{k=1}^{n} F_d(k)v_{d,k}$$

is associated with passivity of the sample/hold unit 43 and becomes maximum when $F_d(k)=F_d(k-1)+\beta_{max}v_{d,k}$. This is because $F_d(k-1)v_{d,k}-F_d(k)v_{d,k}=-\beta(k)v_{d,k}^2 \geq -\beta_{max}v_{d,k}^2$ and $$\min\left(T\sum_{k=1}^{n} F_d(k-1)v_{d,k} - T\sum_{k=1}^{n} F_d(k)v_{d,k}\right) = -T\sum_{k=1}^{n} \beta_{max} v_{d,k}^2.$$

Thus, the first stabilization conditions can be calculated using equation 19.

$$P_H(n) + T\sum_{k=1}^{n} F_d(k-1)v_{d,k} - T\sum_{k=1}^{n} F_d(k)v_{d,k} \geq \quad (19)$$

$$P_H(n) - T\sum_{k=1}^{n} \beta_{max} v_{d,k}^2 \geq 0$$

Thus, the first stabilization conditions can be satisfied by the equation 20.

$$\dfrac{P_H(n)}{T\sum_{k=1}^{n} v_{d,k}^2} \geq \beta_{max} \quad (20)$$

Energy generated by the sample/hold unit 43 can be restricted within the consumable energy by a physical damping element included in the haptic device 41 by selecting βmax that satisfies equation 20.

For example, in the haptic device 41 having a first order degree of freedom, $$P_H(n) \geq T\sum_{k=1}^{n} bv_{d,k}^2,$$

and thus, the first stabilization conditions are satisfied by Expression 21.

$$b \geq \beta_{max} \quad (21)$$

In addition, the second stabilization conditions can be determined using three methods that follow.

A first method for determining the second stabilization conditions is to use Expression $\beta_{min}=0$. This is based on the fact that $$T\sum_{k=1}^{n} F_d(k)v_{d,k}$$

is associated with passivity of the virtual environment 47 and the main controller 46 and has a minimum value if $F_d(k)=F_d(k-1)+\beta_{min}v_{d,k}$. Here, the minimum value can be calculated using equation 22.

$$\min\left(\sum_{k=1}^{n} F_d(k)v_{d,k}\right) = \frac{1}{2}\beta_{min}\left(\sum_{k=1}^{n} v_{d,k}\right)^2 + \frac{1}{2}\beta_{min}\sum_{k=1}^{n} v_{d,k}^2 \quad (22)$$

In this case, the second stabilization conditions can be expressed as equation 23.

$$T\sum_{k=1}^{n} F_d(k)v_{d,k} \geq \frac{1}{2}T\beta_{min}\left(\sum_{k=1}^{n} v_{d,k}\right)^2 + \frac{1}{2}T\beta_{min}\sum_{k=1}^{n} v_{d,k}^2 \geq 0 \quad (23)$$

Thus, the second stabilization conditions are satisfied by equation 24.

$$\beta_{min} \geq 0 \quad (24)$$

A second method for determining the second stabilization conditions is to use Expression $$\beta_{min} = \frac{-F_d(k-1)}{v_{d,k}}.$$

This is based on the fact that the second stabilization conditions (equation 16) are always satisfied if each $F_d(k)v_{d,k}$ is greater than 0. In this case, $F_d(k)v_{d,k}$ can be rewritten using equation 17 as follows.

$$F_d(k)v_{d,k} = F_d(k-1)v_{d,k} + \beta(k)v_{d,k}^2$$

Thus, $\beta(k)$ should be in the following range so that $F_d(k)v_{d,k}$ is greater than 0.

$$\beta(k) \geq \frac{-F_d(k-1)}{v_{d,k}} = \beta_{min}$$

A third method for determining the second stabilization conditions is to use Expression $$\beta_{min} = \frac{-\sum_{k=1}^{n} F_d(k-1)v_{d,k} - \sum_{k=1}^{n-1} \beta(k)v_{d,k}^2}{v_{d,n}^2}.$$

In the case of using equation 17, the second stabilization conditions can be rewritten as follows.

$$\sum_{k=1}^{n} F_d(k)v_{d,k} = \sum_{k=1}^{n} F_d(k-1)v_{d,k} + \sum_{k=1}^{n} \beta(k)v_{d,k}^2$$

$$= \beta(n)v_{d,n}^2 + \sum_{k=1}^{n} F_d(k-1)v_{d,k} + \sum_{k=1}^{n-1} \beta(k)v_{d,k}^2$$

Thus, in order for $\Sigma F_d(k)v_{d,k}$ to be greater than 0, $\beta(n)$ must satisfy the following expression.

$$\beta(n) \geq \frac{-\sum_{k=1}^{n} F_d(k-1)v_{d,k} - \sum_{k=1}^{n-1} \beta(k)v_{d,k}^2}{v_{d,n}^2} = \beta_{min}$$

Thus, one of the three values is selected as $\beta_{min}$ so that the virtual environment 47 and the main controller 46 can be made passive. If the $\beta_{min}$, that is calculated by second or third method, is greater than $\beta_{max}$, the $\beta_{min}$ is constrained by $\beta_{max}$.

As described above, in the energy bounding processing method according to the present invention, energy generated by the sample/hold unit 43 can be limited using the maximum bounding law, and by using the maximum bounding value smaller than the physical damping value shown in Expression 20, energy generated by the sample/hold unit 43 can be limited to a range of energy that can be dissipated by the physical haptic device 41. In addition, the energy bounding processor 50 can make the subsystem comprising the virtual environment 47 and the main controller 46 passive, using the minimum bounding law.

When the virtual environment 47 includes an active element such as a negative damper, by developer's intention or energy stored is released from an energy storage element such as a virtual spring, negative $\beta(k)$ is required. In this case, $\beta_{min}$ can be determined using the second adjusted stabilization conditions expressed as equation 25.

$$T\sum_{k=1}^{n} F_d(k)v_{d,k} - P_{ref}(n) \geq 0 \quad (25)$$

where $P_{ref}(n)$ is a reference energy of the virtual environment 47. If model information is not specified, $$P_{ref}(n) = T\sum_{k=1}^{n} F_e(k)v_{e,k}.$$

This means that the energy bounding processor 50 may not consider passivity of the virtual environment 47.

As described above, in the energy bounding processing method according to the present invention, energy generated by the sample/hold unit 43 can be limited to a range of energy that can be dissipated, and the control system 44 can be made passive.

In addition, the second stabilization conditions adjusted similar to those derived from equation 23 can be expressed as equation 26.

$$T\sum_{k=1}^{n} F_d(k)v_{d,k} - P_{ref}(n) = T\sum_{k=1}^{n} F_d(k-1)v_{d,k} + \quad (26)$$

$$T\sum_{k=1}^{n} \beta(k)v_{d,k}^2 - P_{ref}(n)$$

$$= T\beta(n)v_{d,n}^2 + T\sum_{k=1}^{n} F_d(k-1)v_{d,k} +$$

$$T\sum_{k=1}^{n-1} \beta(k)v_{d,k}^2 - P_{ref}(n)$$

Thus, in the energy bounding processing method related to a behavior of the reference energy, $\beta_{min}$ can be calculated using equation 27.

$$\beta_{min} = \frac{-T\sum_{k=1}^{n} F_d(k-1)v_{d,k} - T\sum_{k=1}^{n-1} \beta(k)v_{d,k}^2 + P_{ref}(n)}{Tv_{d,n}^2} \quad (27)$$

EXPERIMENTAL EXAMPLE

In this experiment, Impulse Engine 2000 as a haptic interface that had been commercially well developed was used. The Impulse Engine 2000 as a high quality force feedback device had been developed by Immersion Corporation for military, robotic, medical, and other various research applications.

The Impulse Engine 2000 has a gimbal structure which enables two degrees of freedom of motion and has capstan mechanisms which use cable transmission enhancing back-drivability instead of a gear. Its workspace is 6"×6" (with respect to ±45°) along x- and y-axis, its maximum force output at the handle is 2 lbs. (8.9N), and its encoder resolution is 0.0008". Thus, maximum stiffness that can be generated by the Impulse Engine 2000 is about 35 KN/m.

Experimental results of virtual walls using the Impulse Engine 2000 will be described with reference to FIGS. 6 through 11.

Figure 6:
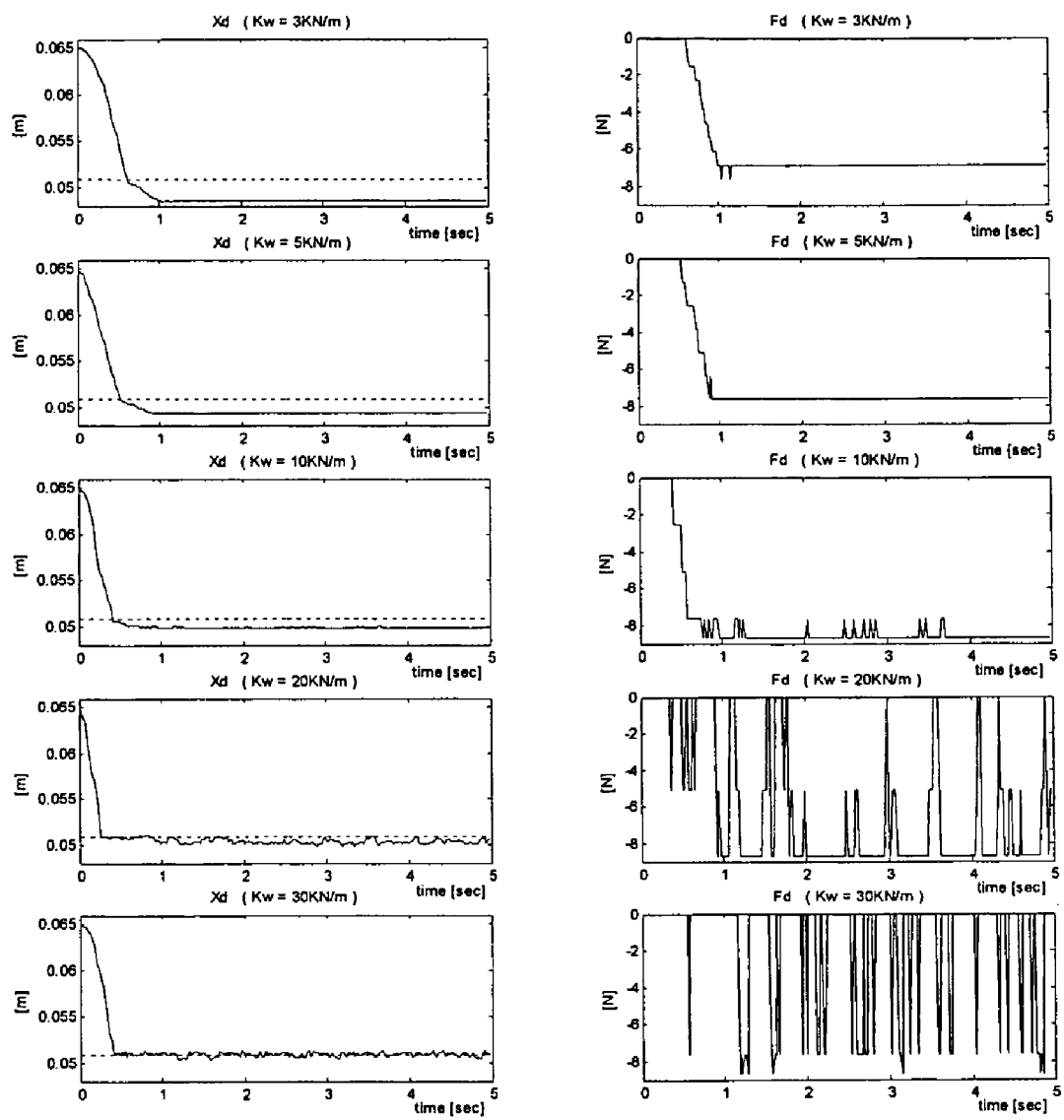
FIG. 6 is a graph showing experimental results of position and an actuator force for virtual walls in which a haptic rendering rate was set to 1 KHz and stiffness of the virtual walls was differently set.

FIG. 6 shows experimental results of the virtual walls when a haptic rendering rate was set to 1 KHz. In this experiment, any control algorithm was not used, and as a result, undesired vibration occurred by energy generated by the sample/hold unit 43. That is, when stiffness of the virtual walls increased to be larger than 20 KN/m, undesired vibration began.

Figure 7:
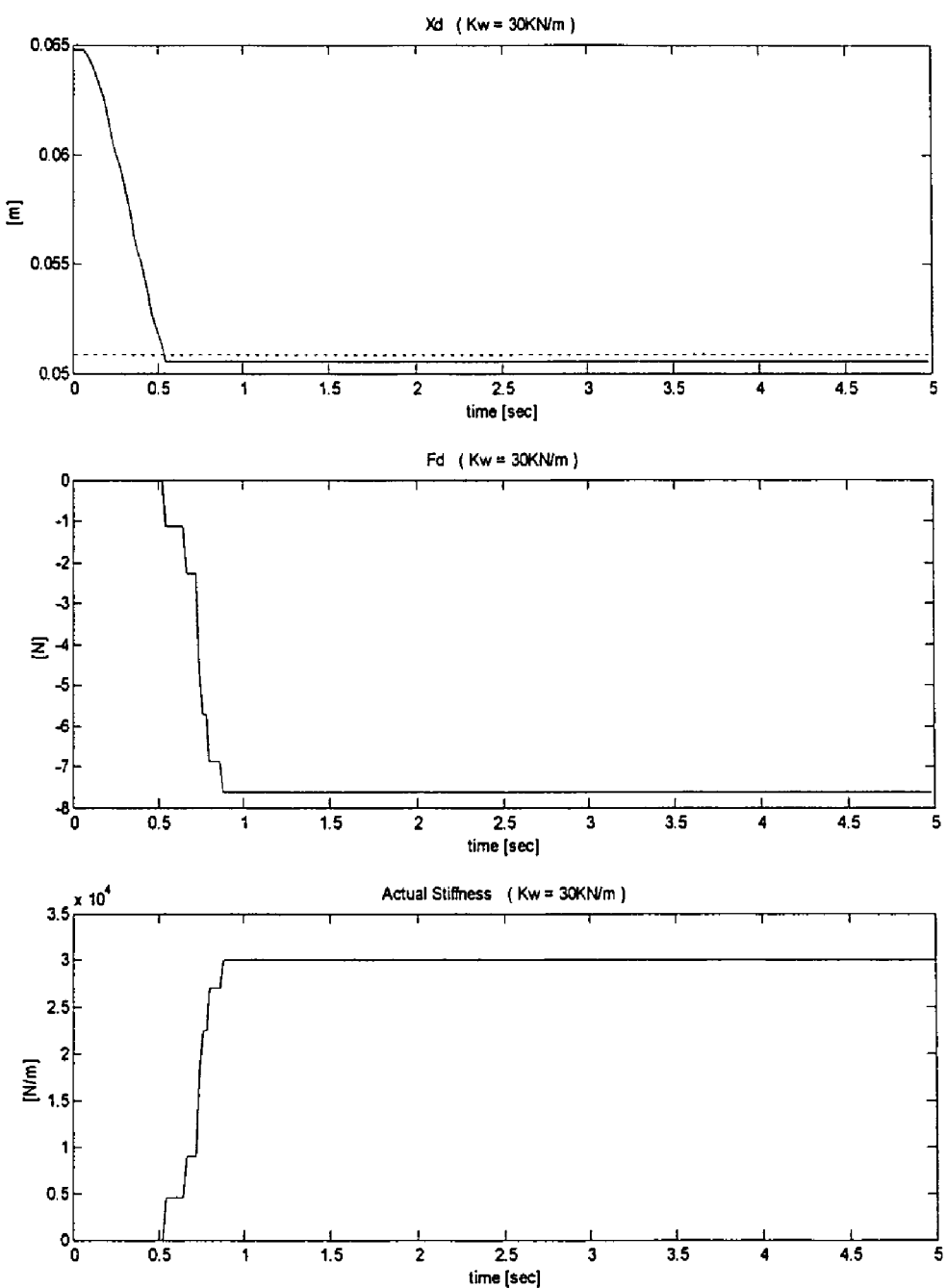
FIG. 7 is a graph showing experimental results of the virtual walls using an energy bounding processing method when stiffness of the virtual walls was set to 30 KN/m and the haptic rendering rate was set to 1 KHz.

FIG. 7 shows experimental results of the virtual walls using an energy bounding processing method when stiffness of the virtual walls was set to 30 KN/m and the haptic rendering rate was set to 1 KHz. As shown in FIG. 7, a stable behavior of a haptic device was provided by the energy bounding processing method even though the virtual walls having high stiffness were used.

Figure 8:
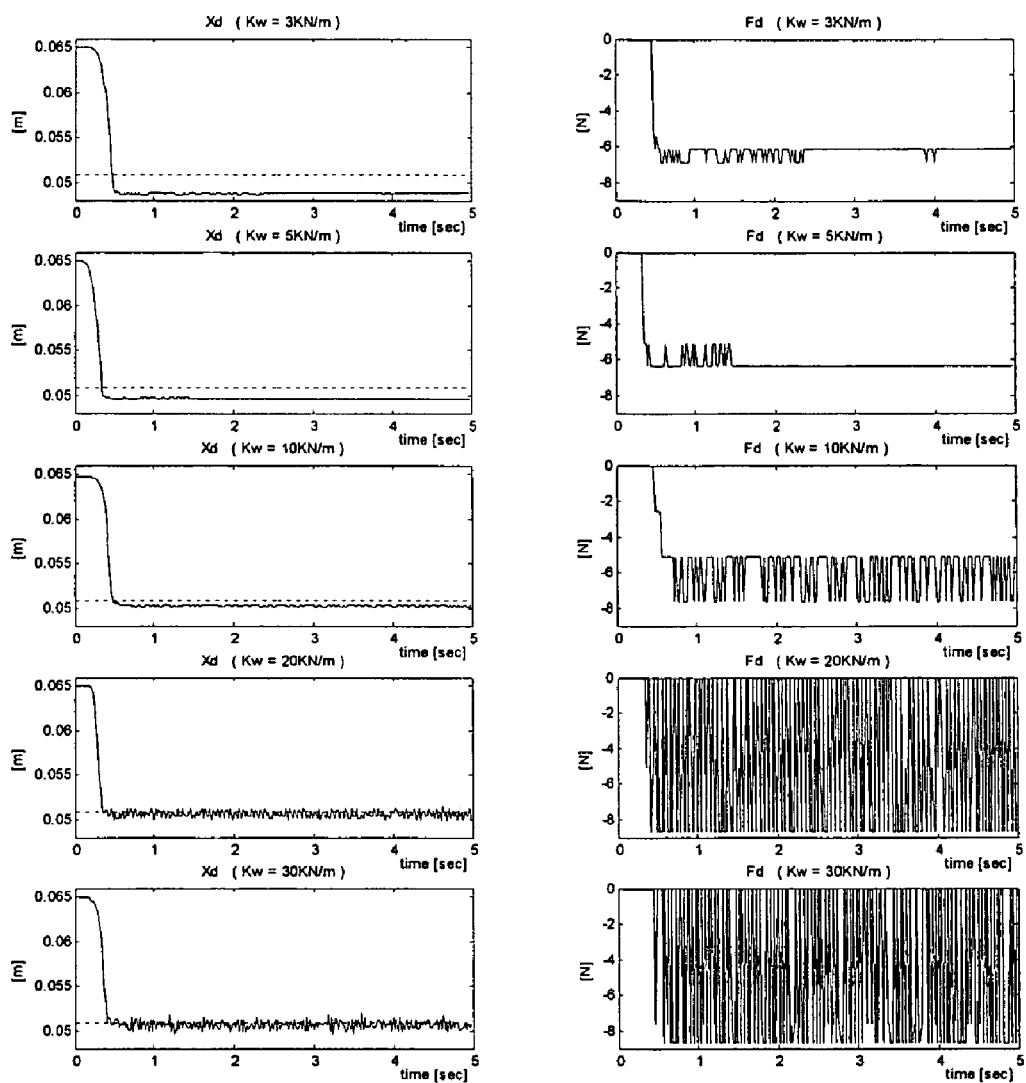
FIG. 8 is a graph showing experimental results of position and an actuator force for the virtual walls in which a haptic rendering rate was set to 500 Hz and stiffness of the virtual walls was differently set.

FIG. 8 shows experimental results of the virtual walls when a haptic rendering rate was set to 500 Hz. When the haptic rendering rate decreased, the range of impedance displayed was reduced without loss of stability. When stiffness of the virtual walls increased to be larger than 10 KN/m, undesired vibration occurred.

Figure 9:
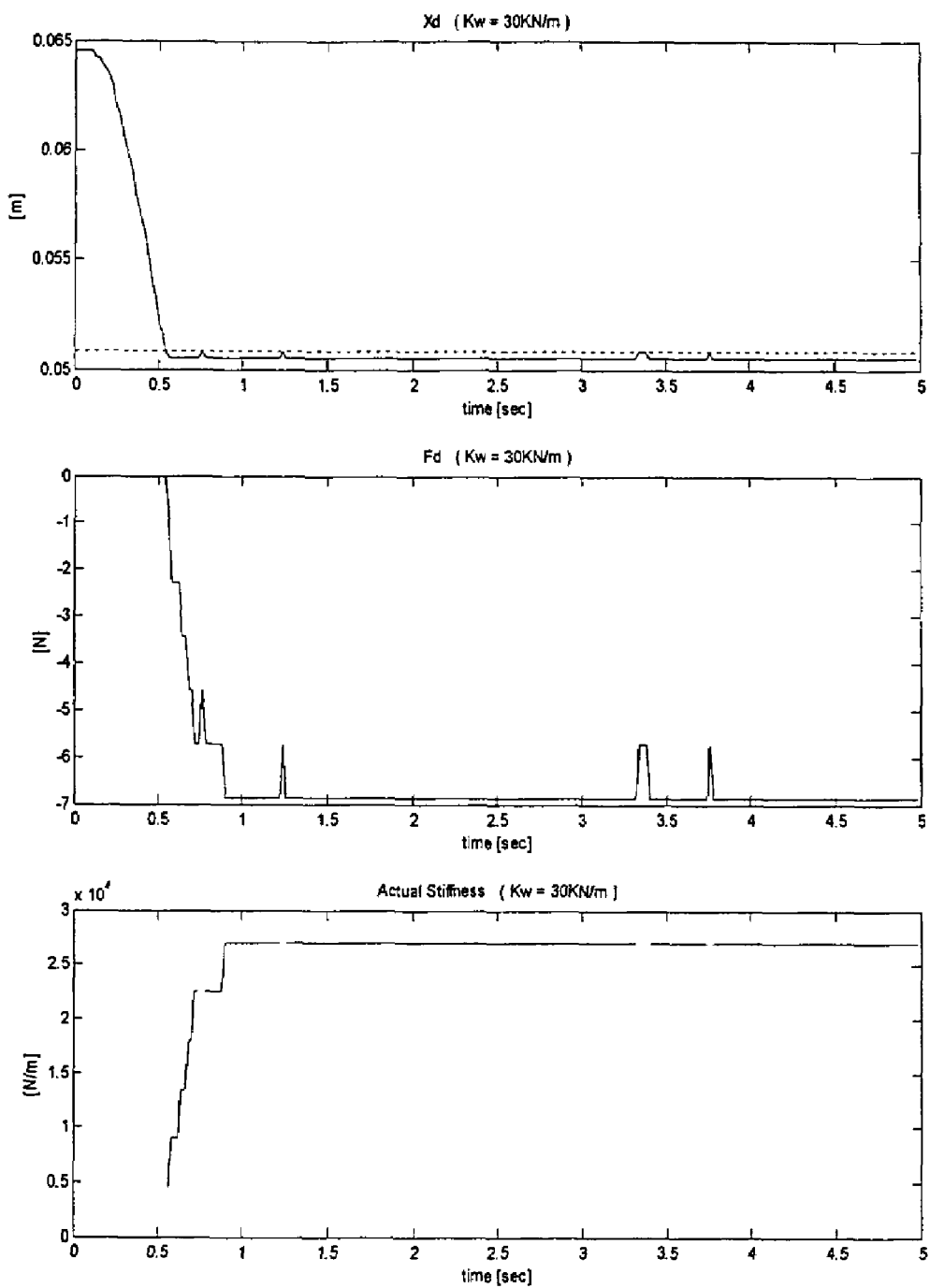
FIG. 9 is a graph showing experimental results of the virtual walls using an energy bounding processing method when stiffness of the virtual wall was set to 30 kN/m and the haptic rendering rate was set to 500 Hz.

FIG. 9 shows experimental results of the virtual walls using an energy bounding processing method when stiffness of the virtual walls was set to 30 KN/m and the haptic rendering rate was set to 500 Hz.

As shown in FIG. 9, a very stable behavior of a haptic device was provided by the energy bounding processing method.

Figure 10:
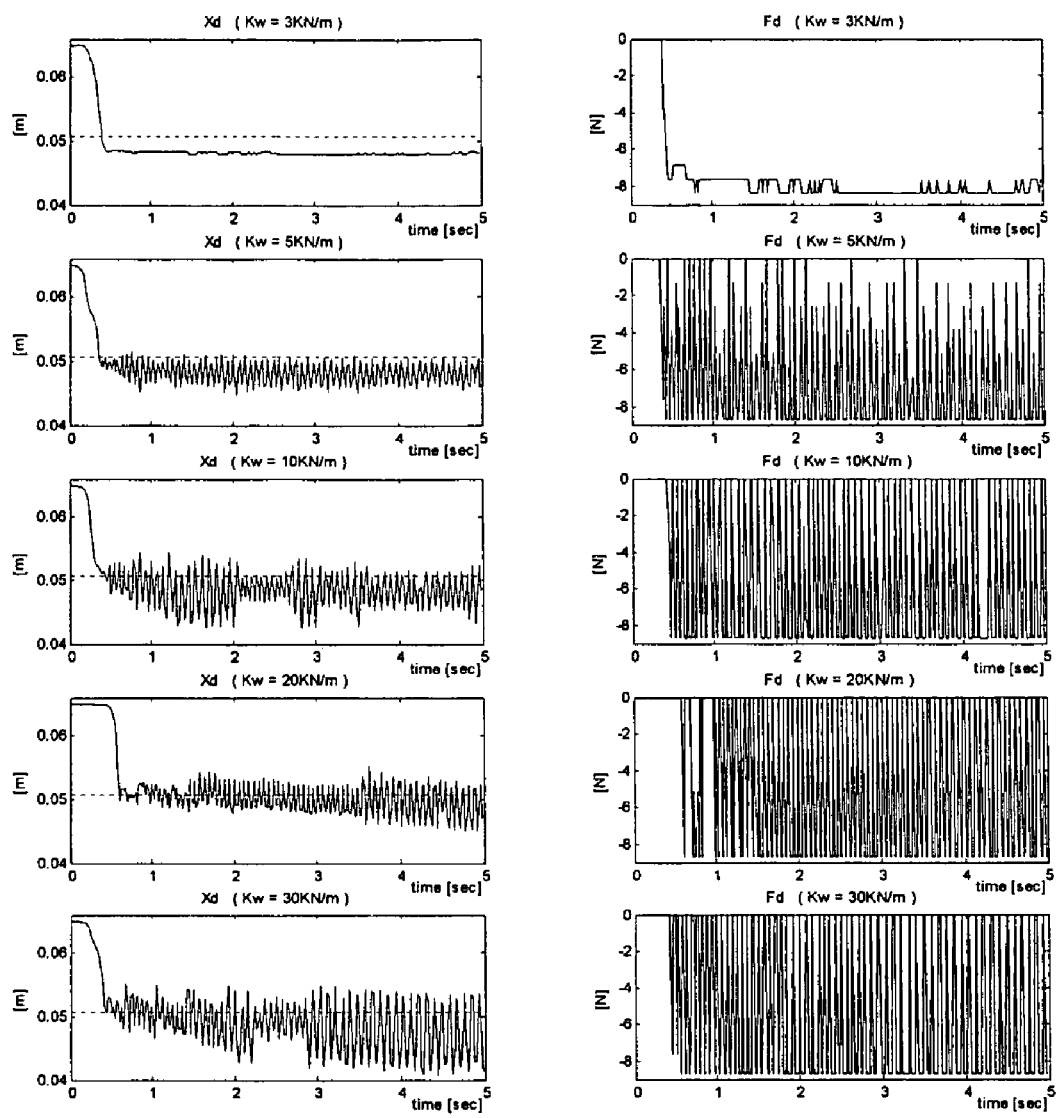
FIG. 10 is a graph showing experimental results of position and an actuator force for the virtual walls in which a haptic rendering rate was set to 100 Hz and stiffness of the virtual walls was differently set.

FIG. 10 shows experimental results of the virtual walls when a haptic rendering rate was set to 100 Hz. When the haptic rendering rate decreased notably, a very bad result was obtained. The virtual walls having stiffness of 5 KN/m caused enormous vibration.

Figure 11:
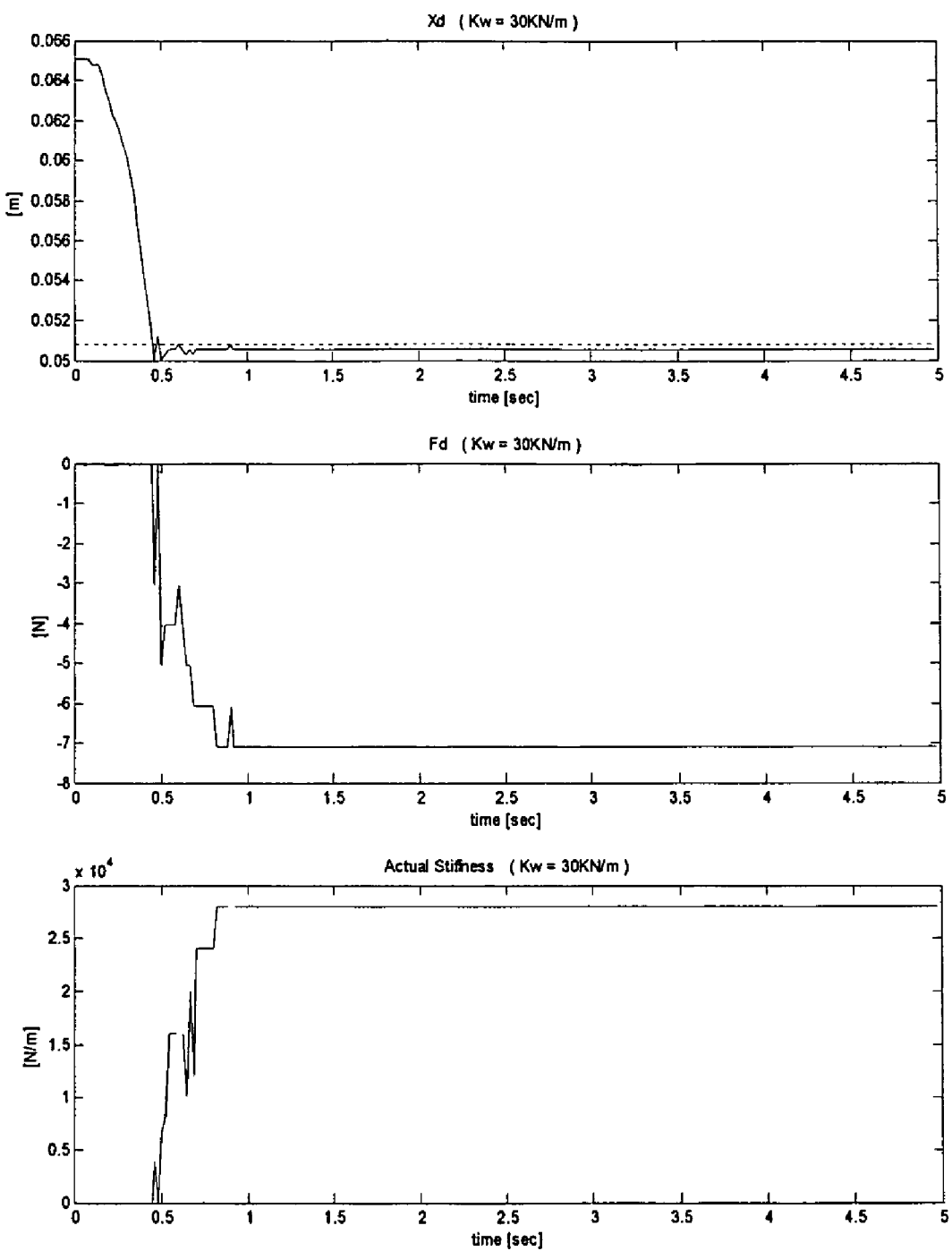
FIG. 11 is a graph showing experimental results of the virtual walls using an energy bounding processing method when stiffness of the virtual walls was set to 30 KN/m and the haptic rendering rate was set to 100 Hz.

FIG. 11 shows experimental results of the virtual walls using an energy bounding processing method when stiffness of the virtual walls was set to 30 KN/m and the haptic rendering rate was set to 100 Hz. The energy bounding processing method provides a more improved behavior of the haptic device 41. In the energy bounding processing method, even though fidelity was lowered partially, stability was not lowered regardless of the haptic rendering rate.

As described above, in the energy bounding processing method according to the present invention, energy generated by zero order hold (ZOH) during sampling/holding can be limited to a range of energy that can be dissipated by physical damping which is a dissipative element in the haptic device 41, and the main controller 46 and the virtual environment 47 can be made passive. Passivity conditions are always guaranteed by the energy bounding processing method. In the prior virtual coupling method, an actuator force related to a passage depth is limited, and generated energy is limited. On the other hand, in the energy bounding processing method, a change of the actuator force is limited and energy generated by ZOH is limited. Thus, by using the energy bounding processing method, simulation having higher stiffness can be implemented. In addition, since the energy bounding processing method does not require load calculation, operations can be simply performed.

As described above, according to the present invention, lowering of a realistic degree which a haptic system pursues is prevented and the haptic system can be stabilized.

What is claimed is:

1. A method of stabilizing a haptic interface of a haptic system in which an interaction between a control system including a virtual environment and a haptic device is supported, the method comprising:

detecting a value of a physical parameter related to a motion generated by a human operator's action in an actual element included in the haptic device at each predetermined time interval;

calculating a force to respond to the human operator reversely through the haptic device in the virtual environment in response to the value of the physical parameter;

calculating a bounding parameter that satisfies first stabilization conditions in which energy generated during sampling and holding is to be dissipated by the haptic device and second stabilization conditions in which energy generated by the control system is to be passive, from the calculated force and the calculated value of the physical parameter;

if the calculated bounding parameter is out of a predetermined bounding range, adjusting the calculated bounding parameter in the predetermined bounding range;

adjusting a force to be applied to the actual element included in the haptic device using the adjusted bounding parameter;

applying the adjusted force to the actual element included in the haptic device; and repeatedly performing the detecting of the value of the physical parameter through the applying of the adjusted force at each predetermined time interval, wherein the bounding parameter β(k) is calculated by $$\beta(k) = \frac{F_e(k) - F_d(k-1)}{v_{d,k}} \text{ or } \beta(k) = T\frac{F_e(k) - F_d(k-1)}{x_{d,k} - x_{d,k-1}},$$

where T is the predetermined time interval, $F_e(k)$ is a force to respond to the human operator in the virtual environment in response to the physical parameter detected at a k-th time interval, $F_d(k-1)$ is a force applied to an actual element of the haptic device 41 at a (k-1)-th time interval, and $V_{d,k}$ and $X_{d,k}$ is velocity or position detected by the haptic device by human operator's manipulation.

2. The method of claim 1, wherein in the adjusting of the calculated bounding parameter, if the bounding parameter β(k) is greater than a predetermined maximum value βmax, the bounding parameter β(k) is adjusted to the maximum value βmax, if the bounding parameter β(k) is smaller than a predetermined minimum value βmin, the bounding parameter β(k) is adjusted to the minimum value βmin, and if the bounding parameter β(k) is between the maximum value βmax and the minimum value βmin, the bounding parameter β(k) is used without changes.

3. A haptic system in which an interaction between a control system including a virtual environment and a haptic device is supported, the haptic system comprising:

a sensor detecting a physical parameter related to a motion generated by the haptic device by a human operator's action; and an energy bounding processor installed in the control system, calculating a bounding parameter that satisfies first stabilization conditions in which energy generated during sampling and holding is to be dissipated by the haptic device and second stabilization conditions in which energy generated by the control system is to be passive, from a force to respond to the human operator reversely through the haptic device in the virtual environment in response to the physical parameter detected by the sensor at each predetermined time interval and the physical parameter, if the calculated bounding parameter is out of a predetermined bounding range, adjusting the calculated bounding parameter in the predetermined bounding range, calculating a force to be applied to the actual element included in the haptic device using the bounding parameter determined by adjustment, and applying the adjusted force to the actual element included in the haptic device, wherein the bounding parameter β(k) is calculated by $$\beta(k) = \frac{F_e(k) - F_d(k-1)}{v_{d,k}} \text{ or } \beta(k) = T\frac{F_e(k) - F_d(k-1)}{x_{d,k} - x_{d,k-1}},$$

where T is the predetermined time interval, $F_e(k)$ is a force to respond to the human operator 30 in the virtual environment in response to the physical parameter detected by the sensor at a k-th time interval, $F_d(k-1)$ is a force applied to an actual element of the haptic device 41 at a (k-1)-th time interval, and $V_{d,k}$ and $X_{d,k}$ is velocity or position detected by the haptic device by human operator's manipulation.

4. The system of claim 3, wherein the energy bounding processor adjusts the calculated bounding parameter β(k) to the maximum value βmax if the bounding parameter β(k) is greater than a predetermined maximum value βmax, adjusts the bounding parameter β(k) to the minimum value βmin if the bounding parameter β(k) is smaller than a predetermined minimum value βmin, and adjusts the bounding parameter β(k) to be used without change if the bounding parameter β(k) is between the maximum value βmax and the minimum value βmin.

* * * * *